(12) United States Patent
Yang et al.

(10) Patent No.: US 11,501,009 B1
(45) Date of Patent: Nov. 15, 2022

(54) ELECTRONIC PRIVACY APPARATUS

(71) Applicant: Lenovo (Singapore) Pte. Ltd., Singapore (SG)

(72) Inventors: Xueyong Yang, Kanagawa (JP); Hiroshi Nakagawa, Kanagawa (JP); Kazuhiro Kosugi, Kanagawa (JP); Yasumichi Tsukamoto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/490,491

(22) Filed: Sep. 30, 2021

(51) Int. Cl.
| | |
|---|---|
| *H04N 5/232* | (2006.01) |
| *G06F 21/74* | (2013.01) |
| *G06F 21/62* | (2013.01) |
| *G06V 40/10* | (2022.01) |

(52) U.S. Cl.
CPC ............. *G06F 21/62* (2013.01); *G06F 21/74* (2013.01); *G06V 40/10* (2022.01); *H04N 5/23216* (2013.01); *H04N 5/23229* (2013.01); *H04N 5/23245* (2013.01)

(58) Field of Classification Search
CPC ........... H04N 5/23296; H04N 5/23212; H04N 5/23216; H04N 5/60; H04N 7/14
See application file for complete search history.

(56) References Cited

U.S. PATENT DOCUMENTS

| | | | | |
|---|---|---|---|---|
| 10,751,572 | B2* | 8/2020 | Quillin | H04N 5/23241 |
| 2006/0015894 | A1* | 1/2006 | Nishinaga | H04M 1/673 |
| | | | | 725/28 |
| 2008/0297586 | A1* | 12/2008 | Kurtz | H04N 7/147 |
| | | | | 348/E7.083 |
| 2009/0147893 | A1* | 6/2009 | Takahashi | H04J 11/0036 |
| | | | | 455/296 |
| 2010/0081116 | A1* | 4/2010 | Barasch | G09B 19/0038 |
| | | | | 434/308 |
| 2021/0254850 | A1* | 8/2021 | Field | G05D 23/1931 |

* cited by examiner

*Primary Examiner* — Hung H Lam
(74) *Attorney, Agent, or Firm* — Osha Bergman Watanabe & Burton LLP

(57) ABSTRACT

An electronic privacy apparatus, for selectively blocking transmission of data from a camera, includes a camera, a first processor, a switch, and a second processor. The first processor is connected to the camera and receives image data from the camera. The switch is connected to the first processor. The second processor is configured to execute an operating system. The first processor implements a transmission state where the first processor transmits the image data to the second processor. The first processor also implements a privacy state where the first processor transmits blank data to the second processor. Based on user input, the switch selects either the transmission state or the privacy state and transmits a signal to the first processor indicating the user input.

14 Claims, 7 Drawing Sheets

ELECTRONIC PRIVACY APPARATUS

BACKGROUND

Many electronic devices include cameras or can be connected to cameras for a wide range of imaging applications. For example, many portable electronic devices such as consumer laptop or notebook computers have integrated cameras that face the user for taking images or video of the user. Under some conditions, a user may want to block image or video data from the camera for privacy purposes. Some electronic devices include a manual shutter that can be physically moved in front of a camera sensor so that the camera is unable to capture image or video data when a user requires privacy. Meanwhile, the image or video data that a camera captures can be used for a range of functions aside from generating images and video for viewing by humans. These functions include image recognition and detection of a human's presence. When using a manual shutter to physically block light from entering a camera, these additional functions would also be disabled.

SUMMARY

In general, one or more embodiments of the invention relate to an electronic privacy apparatus for selectively blocking transmission of data from a camera. The method comprises: a camera; a first processor that is connected to the camera and receives image data from the camera; a switch that is connected to the first processor; and a second processor configured to execute an operating system, wherein the first processor implements: a transmission state where the first processor transmits the image data to the second processor, and a privacy state where the first processor transmits blank data to the second processor, and based on user input, the switch selects either the transmission state or the privacy state and transmits a signal to the first processor indicating the user input.

In general, one or more embodiments of the invention relate to a method for selectively blocking transmission of data from a camera. The method comprises: receiving, by a first processor, image data from a camera; selecting, by a switch based on a user input, either a transmission state or a privacy state of the first processor; transmitting, by the switch, a signal to the first processor indicating the user input; and implementing, by the first processor, the selected transmission state or the privacy state, wherein implementing the transmission state comprises transmitting the image data to a second processor configured to execute an operating system, and implementing the privacy state comprises transmitting a blank data to the second processor.

Other aspects of the invention will be apparent from the following description and the appended claims.

DETAILED DESCRIPTION

Figure 1:
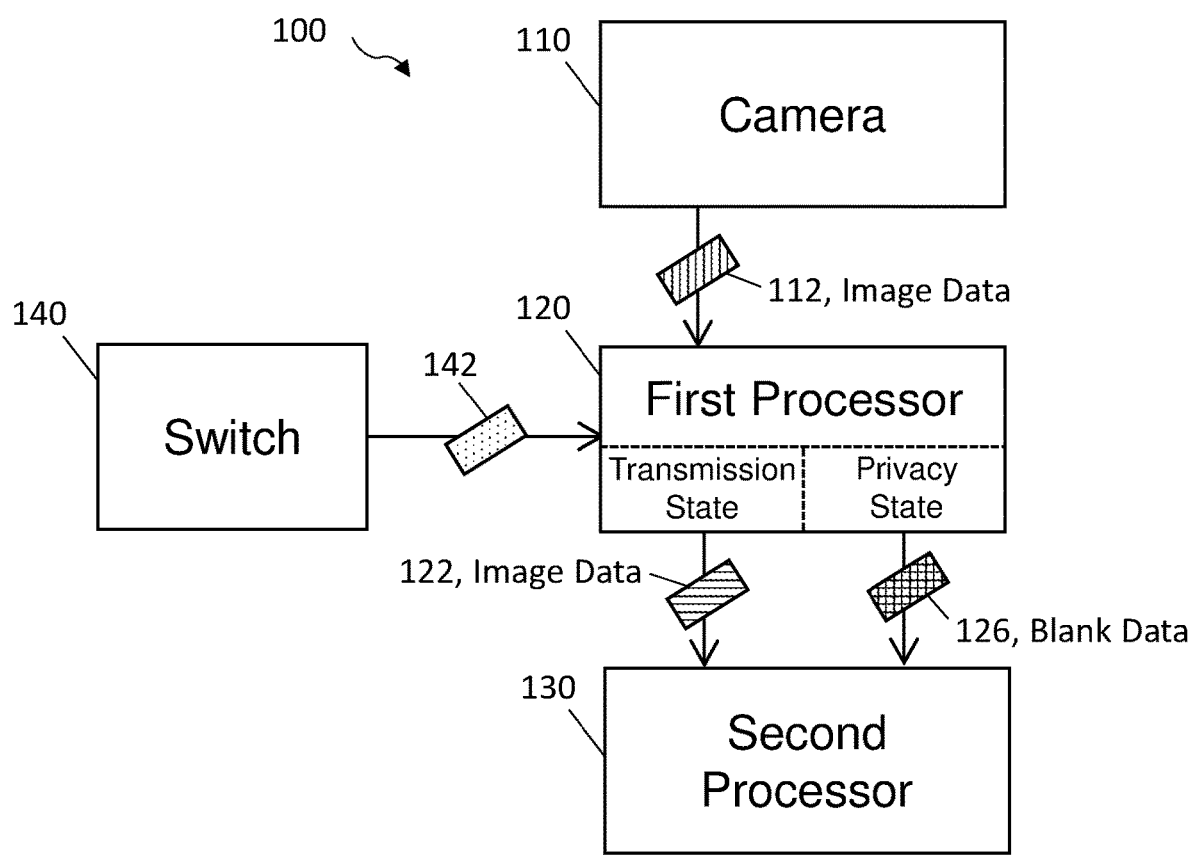
FIG. 1 shows a schematic view of an electronic privacy apparatus according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide an electronic privacy apparatus and a method for selectively blocking transmission of data from a camera. More specifically, embodiments of the invention are directed to an electronic privacy apparatus for implementing a privacy state in a computing device (e.g., a personal computer, personal laptop, smart phone, personal digital assistant, tablet computer, other mobile device, server, etc.). A computing device may include one or more electronic privacy apparatuses 100 in order to implement one or more privacy states.

FIG. 1 shows a schematic view of an electronic privacy apparatus 100 according to one or more embodiments of the invention. As shown in FIG. 1, the electronic privacy apparatus 100 comprises a camera 110, a first processor 120 that is connected to the camera 110, a switch 140 that is connected to the first processor 120, and a second processor 130 configured to execute an operating system. The camera 110 may be integrated into the computing device or may be separate from the computing device. The camera 110 may be disposed in any location of the computing device or be oriented in any direction with respect to the computing device. The electronic privacy apparatus 100 may include one or more cameras 110. Each of the first and second processors 120, 130 may include a central processing unit (CPU), an image processing unit (IPU), an image signal processor (ISP), a graphical processing unit (GPU), a microcontroller unit (MCU), a field programmable gate array (FPGA), any information processing electronic circuitry, or any combination of these components. In one or more embodiments, the second processor 130 may comprise a CPU, IPU, and an ISP. A switch 140 may include any circuitry that enables a selection between two or more options, based on a user input, and transmits a signal, to the first processor 120 and/or the second processor 130, indicating the user input (i.e. indicating the user's selection). The switch 140 may include an embedded controller circuit, a microcontroller, or a processor.

The camera 110 generates image data 112, based on visible light or infrared radiation that enters the camera 110, and transmits the image data 112 to the first processor 120. The first processor 120 receives the image data 112 from the camera 110. The first processor 120 also implements a transmission state where the first processor 120 transmits the image data 122 to the second processor 130, and a privacy state where the first processor 120 transmits blank data 126 to the second processor 130. Transmitting the blank data 126 may include transmitting all blank image data or transmitting a placeholder image that indicates that the privacy state is active. Based on user input, the switch 140 selects either the transmission state or the privacy state and transmits a signal 142 to the first processor 120 indicating the user input. In this way, the electronic privacy apparatus 100 allows a user to select either the transmission state or the privacy state. The transmission state corresponds to a condition where the user wishes to allow the image data 112 from the camera 110 to potentially be shared, and the privacy state corresponds to a condition where the user wishes to ensure that the image data 112 from the camera 110 cannot be shared.

One skilled in the art will recognize that the camera 110 and the first and second processors 120, 130 may transmit the image data 112, 122 and the blank data 126 using various protocols and connections including but not limited to various Mobile Industry Processor Interface (MIPI) protocols or various versions of the Universal Serial Bus (USB) protocol. One skilled in the art will also recognize that the switch 140 may transmit the switch signal 142 using any version of various protocols including but not limited to USB, Inter-Integrated Circuit (I2C), Serial Peripheral Interface (SPI), or General Purpose Input/Output (GPIO).

In one or more embodiments, the first processor 120 may implement the transmission state by processing the image data 112 received from the camera 110 and transmitting a processed image data to the second processor 130. In this case, the processed image data is the image data 122. Processing of the data may include but is not limited to compression or any transformation or change of the image data 112 from its original state.

In one or more embodiments, the first processor 120 may include an FPGA. The FPGA may implement the transmission state by transmitting the image data 112, unprocessed, to the second processor 130. In this case, there is no difference between the image data 112 and the image data 122. In other words, The FPGA can be programed to physically pass the image data directly through it with no processing when in the transmission state, allowing the highest quality image data from the camera 110 to be transmitted to the second processor 130.

In one or more embodiments, the second processor 130 may comprise a CPU disposed on a planar of a laptop computer. The planar should be understood to be the part of the laptop computer where the main motherboard of the laptop computer is disposed.

Figure 2:
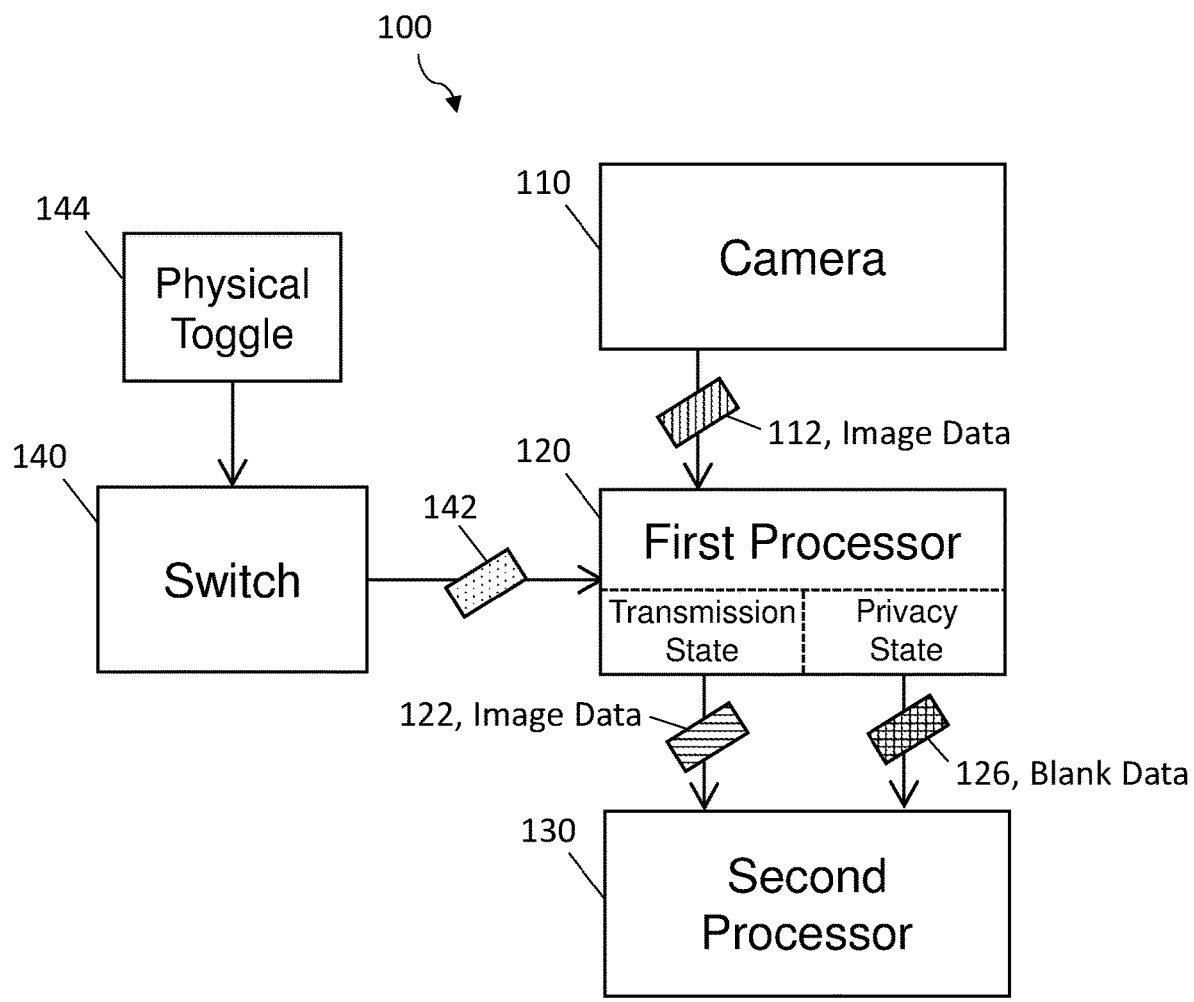
FIG. 2 shows a schematic view of an electronic privacy apparatus according to one or more embodiments of the invention, also including a physical toggle.

FIG. 2 shows another schematic view of the electronic privacy apparatus 100 according to one or more embodiments of the invention. Compared with FIG. 1, FIG. 2 also shows a physical toggle 144 for user input to the switch 140. In one or more embodiments, the physical toggle 144 is based on a keystroke on a computer keyboard. The keystroke is one option for how the user selects between the transmission state and the privacy state. The keystroke may involve a user pressing one key, pressing multiple keys simultaneously, or pressing multiple keys in a sequence in order to operate the switch 140. The physical toggle 144 may also include any type of physical component or button that allows user input to the switch 140.

Figure 3:
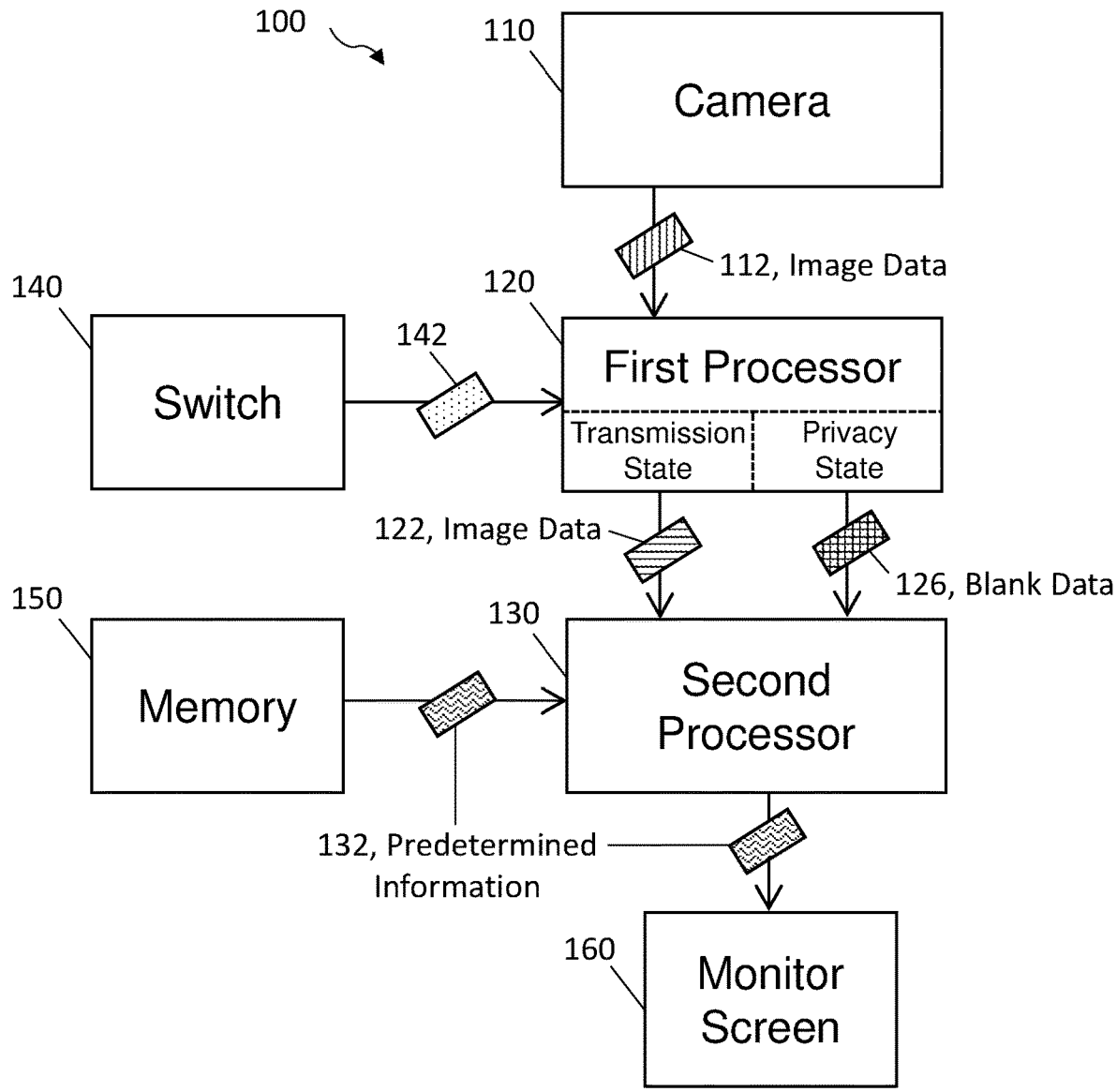
FIG. 3 shows a schematic view of an electronic privacy apparatus according to one or more embodiments of the invention, also including a memory and a monitor screen.

FIG. 3 shows another schematic view of the electronic privacy apparatus 100, according to one or more embodiments of the invention. Compared with FIG. 1, FIG. 3 also shows a memory 150 and a monitor screen 160. The memory 150 stores a predetermined information 132 indicating that the first processor 120 is in the privacy state. The second processor 130 obtains the predetermined information 132 from the memory 150 and displays the predetermined information 132 on a monitor screen 160 when the first processor 120 is in the privacy state. In this way, the electronic privacy apparatus 100 may notify the user when it is in the privacy state so that the user will understand why no image data is available. The predetermined information may include a message, an image, or both indicating that the privacy state is active.

Figure 4A:
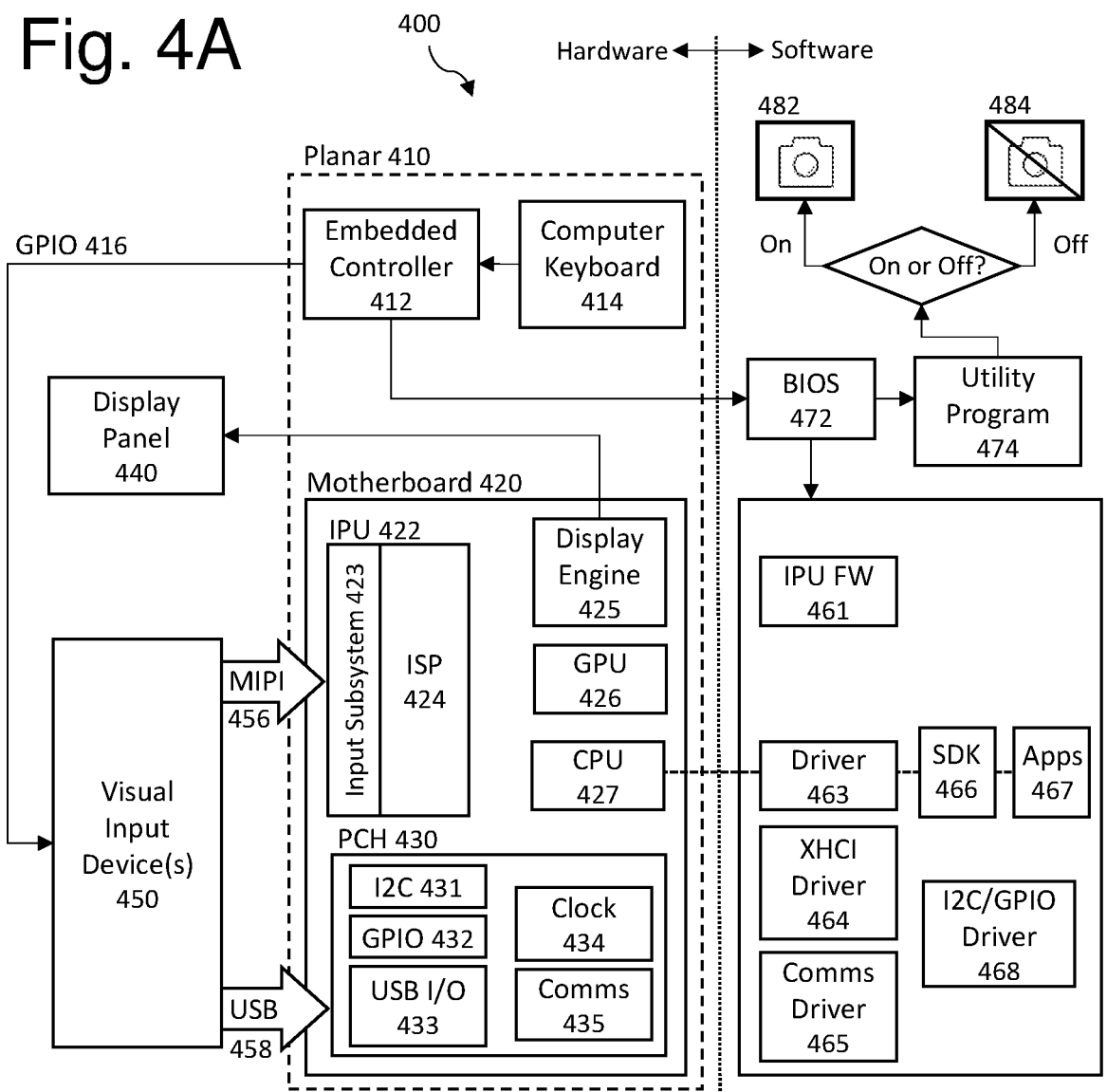
FIG. 4A shows a functional block diagram of an implementation of an electronic privacy apparatus in a laptop computer, according to one or more embodiments of the invention.

FIG. 4A shows a functional block diagram of an implementation of an electronic privacy apparatus 400 in a laptop computer, according to one or more embodiments. A computer keyboard 414 is connected to an embedded controller 412. The embedded controller 412 is connected to one or more visual input devices 450 via a GPIO connection 416. The visual input devices 450 are connected to a motherboard 420 and can transmit data to the motherboard 420 via an MIPI connection 456 or a USB connection 458. The motherboard 420 includes an IPU 422, Platform Controller Hub (PCH) 430, CPU 427, GPU 426, and a Display Engine 425. The IPU 422 includes an Input Subsystem 423 and an ISP 424. The PCH 430 includes modules for transmitting and receiving data via I2C 431, GPIO 432, and USB I/O 433 protocols, and also includes a clock module 434 and a comms (communications) module 435. The Display Engine 425 is connected to a display panel 440 (i.e. a monitor). The dotted rectangle represents the planar 410 of the laptop computer, which represents the part of the laptop computer that houses the motherboard 420 and is typically disposed on the opposite side of a hinge from the display panel 440. The embedded controller 412, computer keyboard 414, and the motherboard 420 are each disposed on the planar 410. Each of the components listed above represents hardware components in the electronic privacy apparatus 400 and the laptop computer. The dash-dot line in FIG. 4A represents a separation between hardware components and software modules that are implemented in computer programs. The software modules include a Basic Input/Output System (BIOS) 472, Utility Program 474, Image Processing Unit Firmware (IPU FW) 461, a Driver 463, a Software Development Kit (SDK) 466, Applications (Apps) 467, an eXtensible Host Controller Interface (XHCI) Driver 464, an I2C/GPIO Driver 468, and a Comms Driver 465.

Figure 4B:
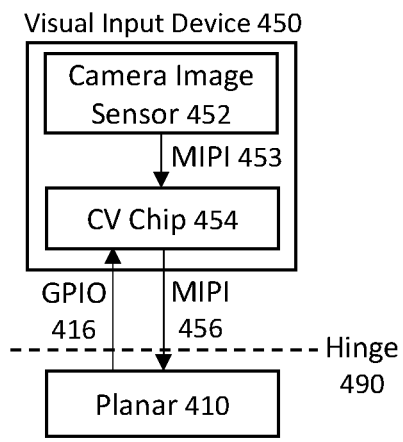
FIG. 4B shows a functional block diagram of a visual input device shown in FIG. 4A.

FIG. 4B shows a functional block diagram of the visual input device 450 shown in FIG. 4A, according to one or more embodiments. The visual input device 450 includes a camera image sensor 452 and a Computer Vision (CV) chip 454. The camera image sensor 452 is connected to the CV chip 454 via a MIPI connection 453. The CV chip 454 is connected to the planar 410 of the laptop computer via a MIPI connection 456 and a GPIO connection 416. These connections cross the hinge 490 of the laptop computer.

Figure 4C:
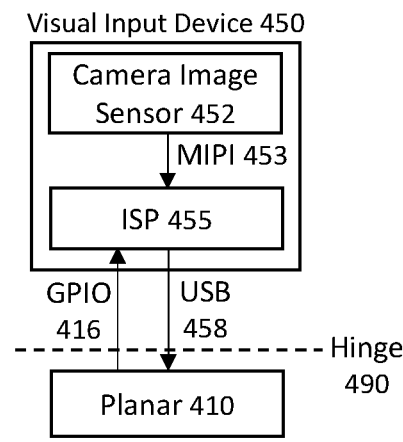
FIG. 4C shows a functional block diagram of the visual input device shown in FIG. 4A.

Similarly, FIG. 4C shows another functional block diagram of the visual input device 450 shown in FIG. 4A, according to one or more embodiments. The visual input device 450 includes a camera image sensor 452 and an ISP 455. The camera image sensor 452 is connected to the ISP 455 via a MIPI connection 453. The ISP 455 is connected to the planar 410 of the laptop computer via a USB connection 458 and a GPIO connection 416. These connections cross the hinge 490 of the laptop computer.

In general, the implementation of the electronic privacy apparatus 400 described above and shown in FIGS. 4A-4C works as follows. The embedded controller 412 receives a signal, indicating a user input, from the computer keyboard 414. The embedded controller 412 selects, based on the user input, either the transmission state or the privacy state and transmits a signal, via the GPIO connection 416, to either the CV Chip 454 or the ISP 455 within the visual input device 450, according to the embodiments depicted in FIG. 4B or FIG. 4C, respectively. In this way, the embedded controller 412 corresponds to the switch 140 shown in FIG. 1. Either the CV chip 454 or the ISP 455 implements the transmission state by transmitting image data from the camera image sensor 452 to the planar 410 or the privacy state by transmitting blank data to the motherboard 420 disposed on the planar 410, based on the signal received from the embedded controller 412. In this way, either the CV chip 454 or the ISP 455 corresponds to the first processor 120 shown in FIG. 1, and the motherboard 420 corresponds to the second processor 130 shown in FIG. 1. The embedded controller 412 also interfaces with the software modules via the BIOS 472. In this way a computer program can display an image or other information 482, 484 to indicate whether the apparatus 400 is in the transmission state or the privacy state, and therefore whether the transmission of the image data is on or off, respectively.

Figure 5:
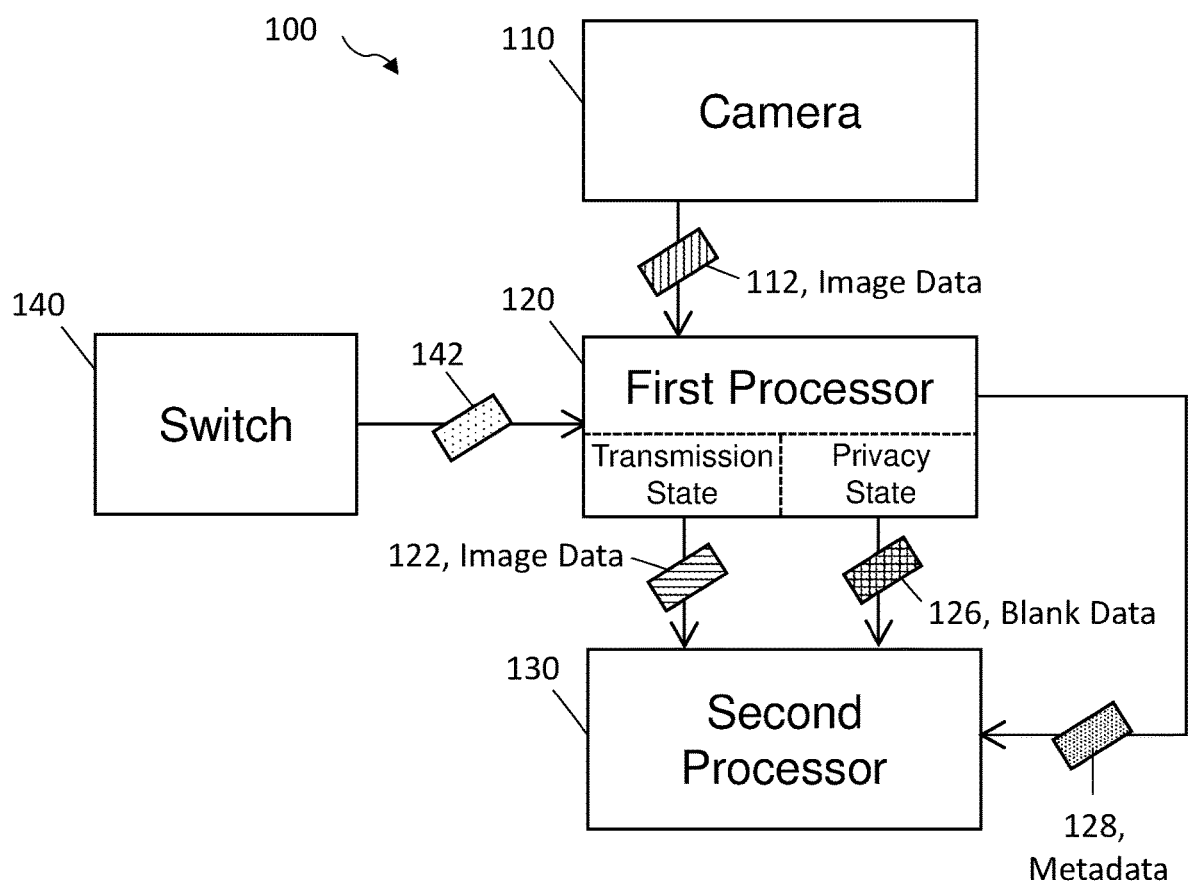
FIG. 5 shows a schematic view of an electronic privacy apparatus according to one or more embodiments of the invention, also including a metadata.

FIG. 5 shows another schematic view of the electronic privacy apparatus 100 according to one or more embodiments of the invention. Compared with FIG. 1, FIG. 5 also shows a metadata 128. By processing the image data 112, the first processor 120 determines a presence of a user within a field of view of the camera 110 and generates a metadata 128 encoding the presence of the user. The first processor 120 transmits the metadata 128 to the second processor 130 when the first processor 120 is in the privacy state. Processing the image data 112 may include but is not limited to various computer vision operations including human detection, facial recognition, identification, classification, etc. In this way, the first processor 120 can perform computer vision operations including detecting the presence of the user and communicating the presence of the user to the second processor 130 even when in the privacy state. In one or more embodiments, the second processor 130 may use the information encoded in the metadata to determine if the computer device should remain active or be put into a sleep mode.

Figure 6A:
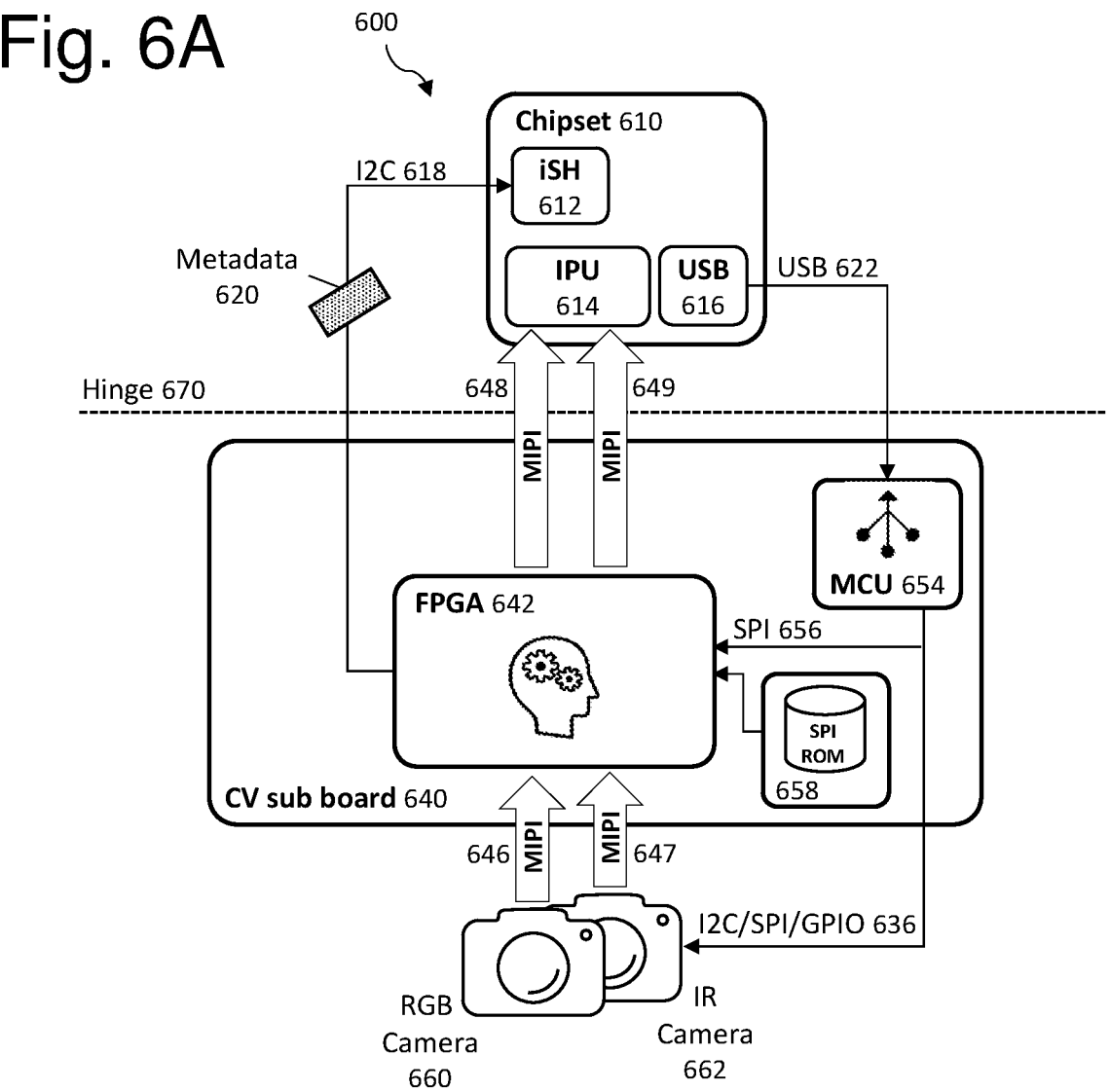
FIG. 6A shows a schematic view of an implementation of an electronic privacy apparatus in a laptop computer, according to one or more embodiments of the invention.

FIG. 6A shows a schematic view of an implementation of an electronic privacy apparatus 600 in a laptop computer, according to one or more embodiments. The apparatus includes one or more cameras (660, 662), a CV sub board 640, and a Chipset 610. The cameras (660, 662) may be either RGB cameras 660 that are sensitive to visible light or infrared (IR) cameras 662 that are sensitive to infrared radiation. The Chipset 610 includes an integrated Sensor Hub (iSH) 612, an Image Processing Unit (IPU) 614, and a USB interface 616. The CV sub board 640 includes an FPGA 642, a Serial Peripheral Interface Read Only Memory (SPI ROM) 658 that is connected to the FPGA 642, and an MCU 654. The cameras (660, 662) are connected to the FPGA 642 via a MIPI (Mobile Industry Processor Interface) connection (646, 647). The cameras (660, 662) are also connected to the MCU 654 via an I2C, SPI, or GPIO connection 636. The FPGA 642 is connected to the MCU 654 via a SPI connection 656 and is connected to the iSH 612 on the Chipset 610 via an I2C connection 618. The FPGA 642 is also connected to the IPU 614 on the Chipset 610 via MIPI connections (648, 649). The MCU 654 is connected to the Chipset 610 via a USB connection 622. The dashed line represents a hinge 670 of a laptop computer, indicating that the Chipset 610 is disposed on the planar of a laptop computer, and the CV sub board 640 and cameras (660, 662) are disposed on the opposite side of the hinge 670 from the planar (i.e. the same side of the hinge 670 as where a display screen would typically be disposed).

Figure 6B:
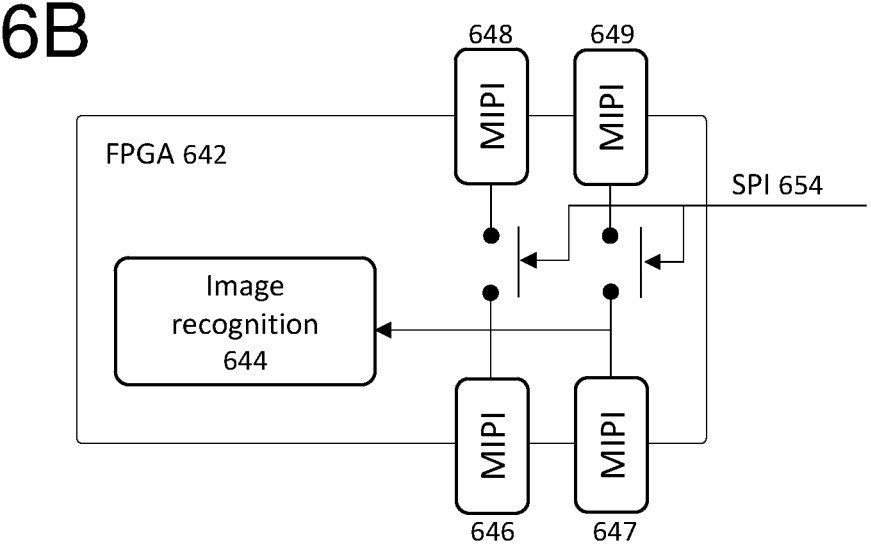
FIG. 6B shows a schematic view of a field programmable gate array (FPGA) shown in FIG. 6A.

FIG. 6B shows a schematic view of the FPGA 642 shown in FIG. 6A. The FPGA 642 includes MIPI connections (646, 647, 648, 649) in and out of the FPGA 642 for one or more cameras (660, 662) and implements an image recognition algorithm 644.

In general, the implementation of the electronic privacy apparatus 600 described above and in FIG. 6A and FIG. 6B works as follows: The FPGA 642 receives image data from the cameras (660, 662). The FPGA 642 implements both a transmission state and a privacy state. The FPGA 642 implements the transmission state by allowing the image data to flow directly through the FPGA 642 and transmitting the image data, unprocessed, to the Chipset 610. The FPGA 642 implements the privacy state by internally disconnecting the transfer lines so that the image data cannot pass through, thereby transmitting blank data to the Chipset 610. In this way, the FPGA 642 corresponds to the first processor 120 shown in FIG. 5, and the Chipset 610 corresponds to the second processor 130 in FIG. 5. Based on user input, the Chipset 610 selects either the privacy state or the transmission state and transmits a signal to the MCU 654, which transmits a signal to the FPGA 642 indicating the user input. In this way, the Chipset 610 also corresponds to the switch 140 shown in FIG. 5. The FPGA 642 also implements an image recognition algorithm 644 that processes the image data. By processing the image data, the FPGA 642 determines a presence of a user within a field of view of the camera (660, 662) and generates a metadata 620 encoding the presence of the user. The FPGA 642 transmits the metadata 620 to the Chipset 610 when the FPGA 642 is in the privacy state. The FPGA 642 may also transmit the metadata 620 when it is in the transmission state. In this way, the FPGA 642 can perform computer vision operations including detecting the presence of the user or image recognition and can communicate the presence of the user to the Chip set 610 even when in the privacy state.

Figure 7:
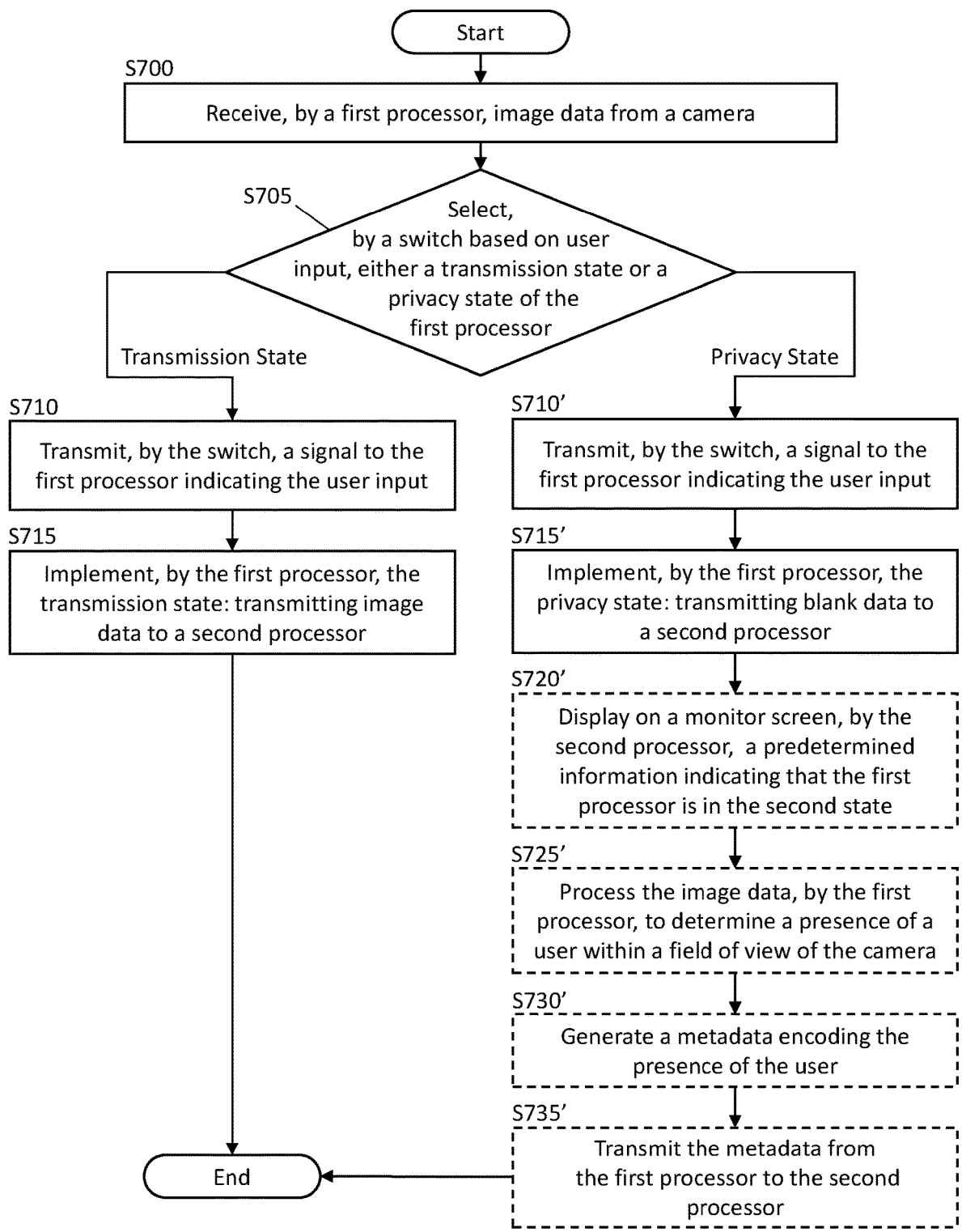
FIG. 7 shows a flowchart of a method for selectively blocking transmission of data from a camera according to one or more embodiments of the invention.

FIG. 7 shows a flowchart of a method for selectively blocking transmission of data from a camera, according to one or more embodiments of the invention. One or more individual processes shown in FIG. 7 may be omitted, repeated, and/or performed in a different order than the order shown in FIG. 7. Accordingly, the scope of the invention should not be limited by the specific arrangement as depicted in FIG. 7.

At S700, a first processor receives image data from a camera.

At S705, a switch selects, based on user input, either a transmission state or a privacy state of the first processor.

At S710, S710', the switch transmits a signal to the first processor indicating the user input (i.e. indicating the user's selection).

At S715, S715', the first processor implements the selected transmission state (S715) or the privacy state (S715'). Implementing the transmission state comprises transmitting the image data to a second processor (S715) configured to execute an operating system. Implementing the privacy state comprises transmitting a blank data to the second processor (S715'). According to one or more embodiments, implementing the transmission state may further comprise processing the image data from the camera by the first processor and transmitting the processed image data to the second processor. According to one or more embodiments, implementing the transmission state may further comprise transmitting the image data, unprocessed, to the second processor.

According to one or more embodiments, the user input may be based on a physical toggle.

At S720' the second processor optionally displays on a monitor screen a predetermined information indicating that the first processor is in the privacy state. According to one or more embodiments, the predetermined information is stored in a memory.

At S725', the first processor optionally processes the image data to determine a presence of a user within a field of view of the camera.

At S730', the first processor optionally generates a metadata encoding the presence of the user.

At S735', the first processor optionally transmits the metadata to the second processor when the first processor is in the privacy state.

One or more of the embodiments of the invention may have one or more of the following improvements to privacy shutters in computing devices: a fully electronic apparatus for block transmission of image data from a camera; the ability to switch between the privacy state and the transmission state by multiple methods of user input, including keyboard keys and software controls; the ability to perform computer vision processes such as human presence detection and image recognition even when the electronic privacy apparatus is in the privacy state; transmitting metadata to a second processor that indicates the presence of a user even when in the privacy state, allowing the second processor perform functions based on the presence of a user while blocking the second processor from access to the image data. These advantages demonstrate that one or more embodiments of the present invention improve the management of a user's image data privacy when using a computing device.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An electronic privacy apparatus for selectively blocking transmission of data from a camera comprising:
 a camera;
 a first processor that is connected to the camera and receives image data from the camera;
 a switch that is connected to the first processor; and
 a second processor configured to execute an operating system, wherein
 the first processor implements:
  a transmission state where the first processor transmits the image data to the second processor, and
  a privacy state where the first processor transmits blank data to the second processor, and
 based on user input, the switch selects either the transmission state or the privacy state and transmits a signal to the first processor indicating the user input.

2. The apparatus according to claim 1, wherein the first processor implements the transmission state by processing the image data received from the camera and transmitting a processed image data to the second processor.

3. The apparatus according to claim 1, wherein the first processor comprises a field programmable gate array and implements the transmission state by transmitting the image data, unprocessed, to the second processor.

4. The apparatus according to claim 1, wherein the second processor comprises a central processing unit disposed on a planar of a laptop computer.

5. The apparatus according to claim 1, wherein the user input is based on a physical toggle.

6. The apparatus according to claim 1, further comprising:
 a memory storing a predetermined information indicating that the first processor is in the privacy state, wherein
 the second processor obtains the predetermined information from the memory and displays the predetermined information on a monitor screen when the first processor is in the privacy state.

7. The apparatus according to claim 1, wherein
 by processing the image data, the first processor determines a presence of a user within a field of view of the camera and generates a metadata encoding the presence of the user, and
 the first processor transmits the metadata to the second processor when the first processor is in the privacy state.

8. A method for selectively blocking transmission of data from a camera, the method comprising:
 receiving, by a first processor, image data from a camera;
 selecting, by a switch based on a user input, either a transmission state or a privacy state of the first processor;
 transmitting, by the switch, a signal to the first processor indicating the user input; and
 implementing, by the first processor, the selected transmission state or the privacy state, wherein
 implementing the transmission state comprises transmitting the image data to a second processor configured to execute an operating system, and
 implementing the privacy state comprises transmitting a blank data to the second processor.

9. The method according to claim 8, wherein implementing the transmission state further comprises:
 processing the image data from the camera by the first processor and transmitting a processed image data to the second processor.

10. The method according to claim 8, wherein
 the first processor comprises a field programmable gate array, and implementing the transmission state further comprises:
  transmitting the image data, unprocessed, to the second processor.

11. The method according to claim 8, wherein the second processor comprises a central processing unit disposed on a planar of a laptop computer.

12. The method according to claim 8, wherein the user input is based on a physical toggle.

13. The method according to claim 8, further comprising:
 displaying on a monitor screen, by the second processor, a predetermined information indicating that the first processor is in the privacy state, wherein
 the predetermined information is stored in a memory.

14. The method according to claim 8, further comprising:
processing the image data, by the first processor, to determine a presence of a user within a field of view of the camera,
generating a metadata encoding the presence of the user, and
transmitting the metadata from the first processor to the second processor when the first processor is in the privacy state.

* * * * *